United States Patent [19]

Nysen

[11] Patent Number: 5,252,979
[45] Date of Patent: Oct. 12, 1993

[54] UNIVERSAL COMMUNICATION SYSTEM
[75] Inventor: Paul A. Nysen, Randwick, Australia
[73] Assignee: Lanen Holdings Pty. Ltd., Randwick, Australia
[21] Appl. No.: 979,968
[22] Filed: Nov. 23, 1992
[51] Int. Cl.[5] .................. G01S 13/08; H04Q 11/00; H04B 1/38; H04B 7/14
[52] U.S. Cl. .................................. 342/50; 370/53; 375/7; 455/19; 455/73
[58] Field of Search ............... 370/53; 375/7; 342/50; 455/19, 73

[56] References Cited
U.S. PATENT DOCUMENTS

| | | | |
|---|---|---|---|
| 4,479,246 | 10/1984 | Young | 455/50 |
| 5,036,518 | 7/1991 | Tseung | 371/32 |
| 5,079,628 | 1/1992 | Tomikawa | 358/86 |
| 5,130,983 | 7/1992 | Heffner | 370/85.8 |

Primary Examiner—Stephen C. Buczinski
Attorney, Agent, or Firm—Sprung Horn Kramer & Woods

[57] ABSTRACT

A communication system for use in an area having a human environment delimited from below by a floor and from above by an overhead environment substantially clear of human presence. The communication system includes a first information source operative to independently generate first information; a plurality of second information sources, each operative to independently generate second information; a plurality of controllers, each coupled to the first information source and arranged in the overhead environment, for producing a substantially downwardly directed communication beam at a prescribed carrier frequency, imparting the first information to the beam, receiving a reradiated version of the beam and detecting therefrom the second information, the controllers being arranged such that the beams substantially contiguously irradiate a region of said human environment; and a plurality of communicators, each coupled to one of the second information sources and arranged in the human environment. Each communicator includes means for receiving one of the beams, detecting the first information from the one beam and supplying the first information to an information user. Each communicator further includes means for reradiating the one beam in the direction of the controller that produced it and means for imparting the second information to the reradiated version of the beam. According to the invention each of said communicators further include a first means for generating a carrier signal at substantially the same frequency as the prescribed carrier frequency; a second means, coupled to the first means, for modulating the carrier signal with the second information signal to produce a modulated carrier signal; a third means for transmitting the modulated carrier signal substantially omni-directionally within the human environment; and a fourth means for controlling the operation of at least one of the first, second and third means. Each of said communicators is thereby operative to receive the modulated carrier signal and to reproduce the second informational signal.

4 Claims, 11 Drawing Sheets

TRANSMISSION MODE

REFLECTION MODE

UNIVERSAL COMMUNICATION SYSTEM

BACKGROUND OF THE INVENTION

The present invention relates to a communication system for use in an area having a human environment delimited from below by a floor and from above by an overhead environment substantially clear of human presence.

More particularly, the present invention relates to a communication system comprising one or more first transmitter/receiver units, called "controllers", arranged in an overhead environment, for producing a substantially downwardly directed communication beam, and a plurality of second transmitter/receiver units, called "communicators", arranged within the human environment.

A communication system of this type has many uses and applications; for this reason the communication system may be termed a "universal communication system". One of the principle applications of the invention, however, is to provide communication between hand-held or desktop computers in a so-called "wireless local area network" or "wireless LAN".

In order to avoid the necessity of completely rewiring a building, and in order to provide a communication link to mobile devices, such as notebook computers which are moved from place to place, conventional, hard-wired LAN's are being replaced by the more convenient wireless LAN. The design goals for a wireless LAN communication system include the following:

(1) Wide Band: In order to accommodate the vast quantities of information that must be transmitted back and forth between terminals, it is desirable that the communication link have many megabytes per second of bandwidth.

(2) Low Power: Since hand-held terminals in particular must operate on battery power, it is desirable that the power requirements for transmitting from such terminals be extremely low.

(3) Low Radiation Hazard: It is desirable to keep the radiation levels to a minimum to avoid health hazards to people in the LAN environment. It is well known that high levels of radiation can cause cataracts, cancer and even brain damage.

One type of wireless LAN that has been proposed includes a central radio base station which communicates with all the terminals in an entire building or floor. In order to overcome the effect of path loss, both the base station and the terminals must transmit with considerable RF power. In addition, in order to cover a large area with a single radio source and limit the effects of reflections, it is necessary to limit the bandwidth of each separate communication.

Another well-known wireless LAN provides an ad hoc communication link between terminals in the same room. Communication is effected by transmitting an infrared signal which may be received almost everywhere within the room or partitioned area either by direct line of sight or after reflection from the walls and/or ceiling. Although infrared transmission meets the bandwidth, power and radiation hazard requirements mentioned above, the signal cannot pass through walls, be they permanent or merely temporary barriers, and the infrared link is not tolerant of the sunlight which may enter through windows of the building.

The U.S. patent application Ser. No. 07/477,996, filed Apr. 16, 1990, entitled "Passive Universal Communicator System", now U.S. Pat. No. 5,164,985, discloses a LAN which provides wireless communication between computer terminals, telephones, video terminals and the like, at a local site (e.g., within a building).

This communication system, which avoids many of the difficulties of the prior art, comprises essentially two types of elements:

(1) a controller mounted in an overhead environment for illumination downward within a cone shaped region; and (2) a communicator which is located within the human environment; i.e., in the region of the floor up to a height of about two meters (six and a half feet).

The controller transmits a communication beam, such as a microwave beam, and imparts "first information" to this beam. The communicator, in turn, reradiates this beam back toward the controller and imparts "second information" to the reradiated beam.

The "first information" and "second information" are completely independent of each other. For example, the "first information" can be video information intended to be displayed on the communicator's video screen. The "second information", for example, may be typewritten text entered into the keyboard of the communicator by the terminal user.

The communicator has no transmitted energy power source of its own. It simply receives the incoming beam from the controller, detects the "first information" on this beam, modulates the beam carrier with the "second information" and reradiates this same beam toward the controller for receipt and demodulation by the controller. The reradiated beam containing the "second information" is known in the art as "modulated backscatter".

While this system fulfills all the design requirements noted above and is extremely robust in its operation (in the sense that it cannot be effected by sunlight or other environmental influences), it has a disadvantage that it is unable to form an ad hoc network; that is, a network formed among a few communicator terminals within a small region of space. Instead, for a communication between one communicator and another, either within the same room or outside the room, it is necessary for a first communicator to send its "second information" to the controller immediately above. This controller is in communication with all other controllers within the LAN; these controllers, in turn, transmit the "second information" received from the first communicator. All other communicators within the network are thus capable of receiving this information.

While this mode of communication is safe and reliable, it is unnecessarily cumbersome for certain circumstances. For example, if is desired for one computer terminal to transmit to a single adjacent computer terminal, the extensive capability of the wireless LAN is not required.

SUMMARY OF THE INVENTION

It is therefore a principal object of the present invention to provide a wireless LAN of the type described in the aforementioned U.S. patent application Ser. No. 07/477,996, which permits the formation of ad hoc networks.

This object, as well as other objects and advantages which will become apparent to those skilled in the art, are achieved, in accordance with the present invention, by providing a communication system of the aforementioned type, wherein each of the communicators includes:

(1) an oscillator for generating a carrier signal at substantially the same frequency as that of the downwardly directed communication beam(s) produced by the controller(s);
(2) a device for modulating (preferably amplitude modulating) the carrier signal with an independent information signal to produce a modulated carrier signal;
(3) a device, including an amplifier and an antenna, for actively transmitting the modulated carrier signal within the human environment; and
(4) a control device for controlling the operation of the system in such as way as to enable the transmission of the modulated carrier signal only during periods in which normal wireless LAN communication is not taking place.

The preferred embodiments of the present invention will now be described with reference to the accompanying drawings.

DETAILED DESCRIPTION OF THE PREFERRED EMBODIMENTS

Figure 1:
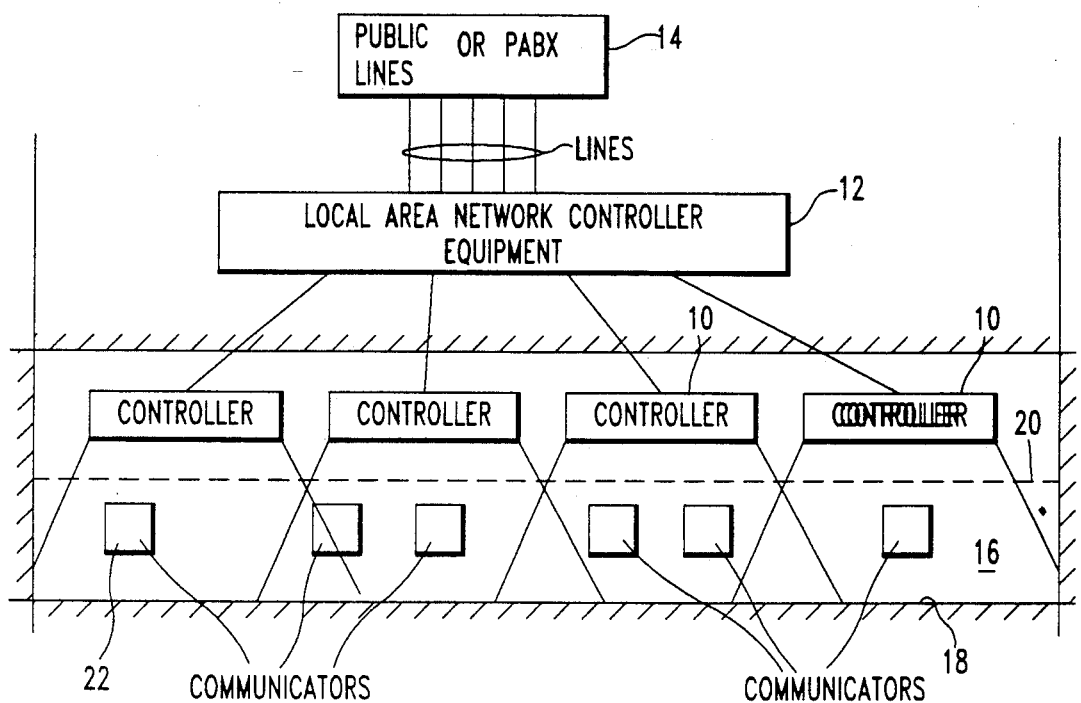
FIG. 1 is a representational diagram showing the physical structure of the wireless LAN which forms the basis of the present invention.

The preferred embodiments of the present invention will now be described with reference to FIGS. 1-18 of the drawings. Identical elements in the various figures are designated with the same reference numerals.

FIG. 1 illustrates the basic CEDCOM TM Microwave Automatic Transaction System, or "C-MATS". This system provides an electromagnetic energy two-way signal exchange in which the signal energy is generated at only one end of the two-way link by a signal generating transmitter/receiver unit called a "controller". The other end of the two-way link, which normally operates passively and therefore does not generate an electromagnetic energy signal of its own, provides return signals by reradiating its received energy. This portable signal receiver/reradiator transaction unit is called a "communicator".

The signals between a controller and a communicator are appropriately modulated to produce digital and/or analog outputs at the controller and the communicator. These outputs provide the data signals to enable data communication to take place in both directions either simultaneously (full duplex operation) or sequentially (half duplex operation).

The controllers 10 are connected together in a local area network 12 (LAN) which, in turn, may be connected to a larger network via public telephone lines or a PABX 14. The controllers are located within or just below the ceiling of a room or rooms 16 of a building and operate to radiate electromagnetic energy downward into the human environment of this room or rooms. This human environment is delimited by the floor 18 and an imaginary upper limit 20: a plane approximately six and on half feet above the floor. One or more communicators 22 may be operated, as desired, within this human environment.

Figure 2:
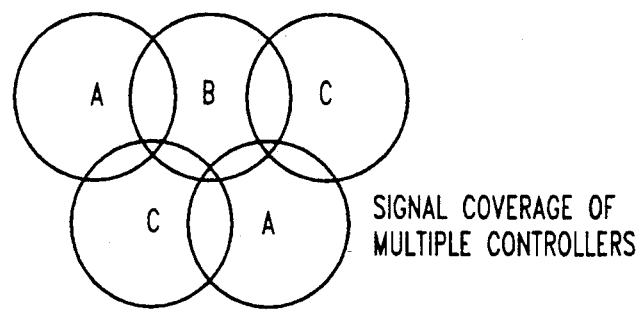
FIG. 2 is a plan view showing the signal coverage of multiple controllers that are represented in FIG. 1.

FIG. 2 shows the radiation pattern of the multiple controllers within the human environment. Each controller transmits a cone-shaped wave pattern vertically downward so that these patterns intersect at approximately the level of the plane 20. By various means which will be discussed below, for example by providing different frequencies A, B and C, a communicator can distinguish between the signals produced by different controllers.

A typical application of the communication system of FIG. 1 is to provide communication between a number of desktop or hand-held computers. Each computer is provided with the communicator hardware required to receive electromagnetic (EM) energy from a controller detect from this received energy a "first information" signal that was imparted to the EM beam by the controller; impart a "second information" signal to the received energy and reradiate the energy as an EM beam back toward the controller.

Figure 3:
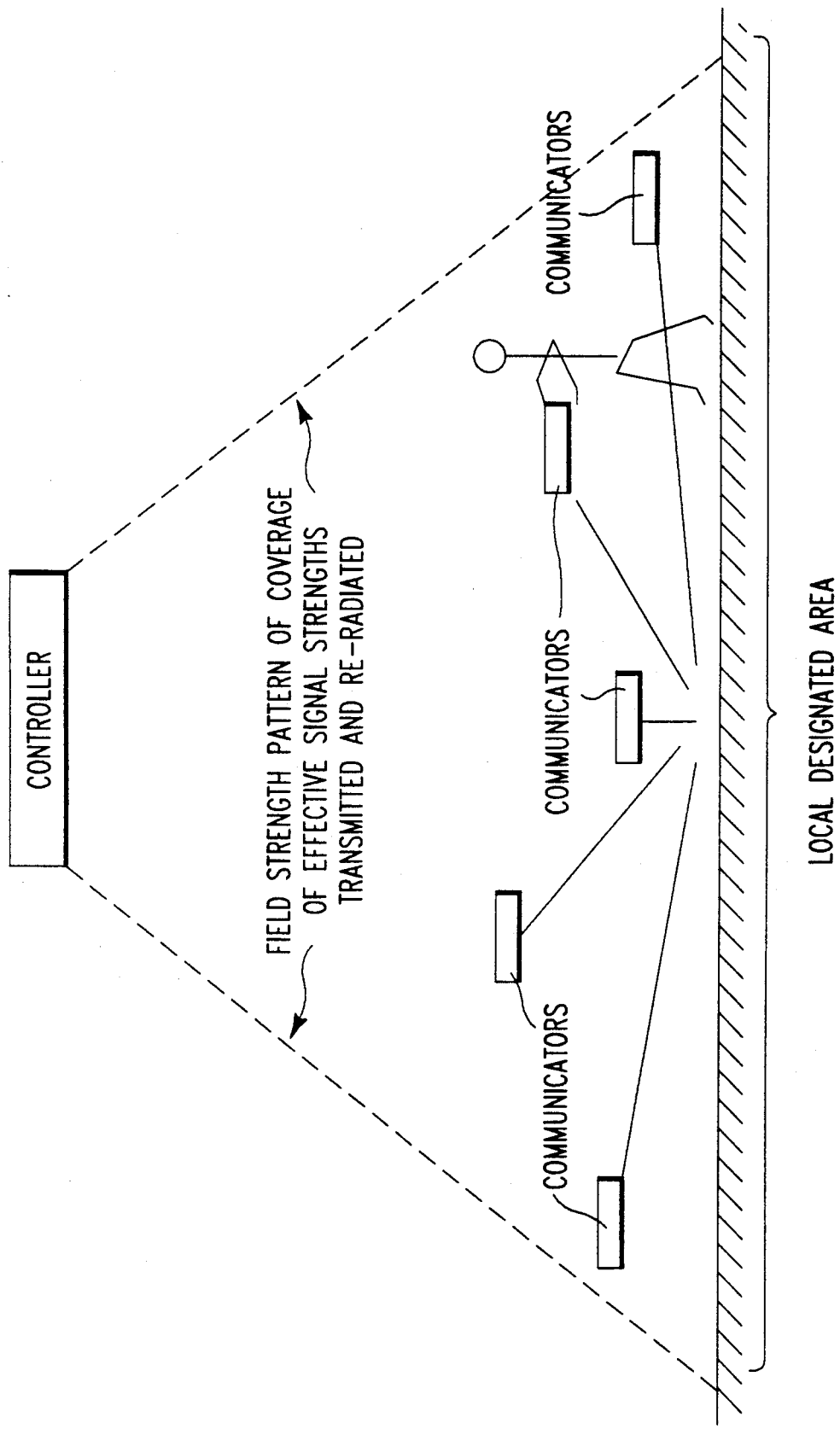
FIG. 3 is a representational diagram of a single controller with a plurality of communicators arranged within a local designated area.

As illustrated in FIG. 3, in operation a person carrying a communicator is able to make or receive calls when they are within the beam-illuminated zone of the controller. To transmit the "second information" from the communicator to a controller, the communicator may be accessed by a secret PIN or some other transaction approving action which is keyed to activate the security system. Once communication is established, the telephone number required is then dialed in the conventional manner.

Throughout this network communication, the communicator is "passive" in the signal generation sense, receiving all signal energy from the controller and reradiating this received signal energy with the "second information" signal back to the controller in a "backscatter modulation" mode. Logic circuitry and software "lock" each communicator into its presently communicating controller. Given the directivity of the communicator antenna and the low EM energy levels used, eavesdropping is extremely difficult. Any eavesdropping device used would have to be physically located between the communicator and controller to receive both signals.

Figure 4:
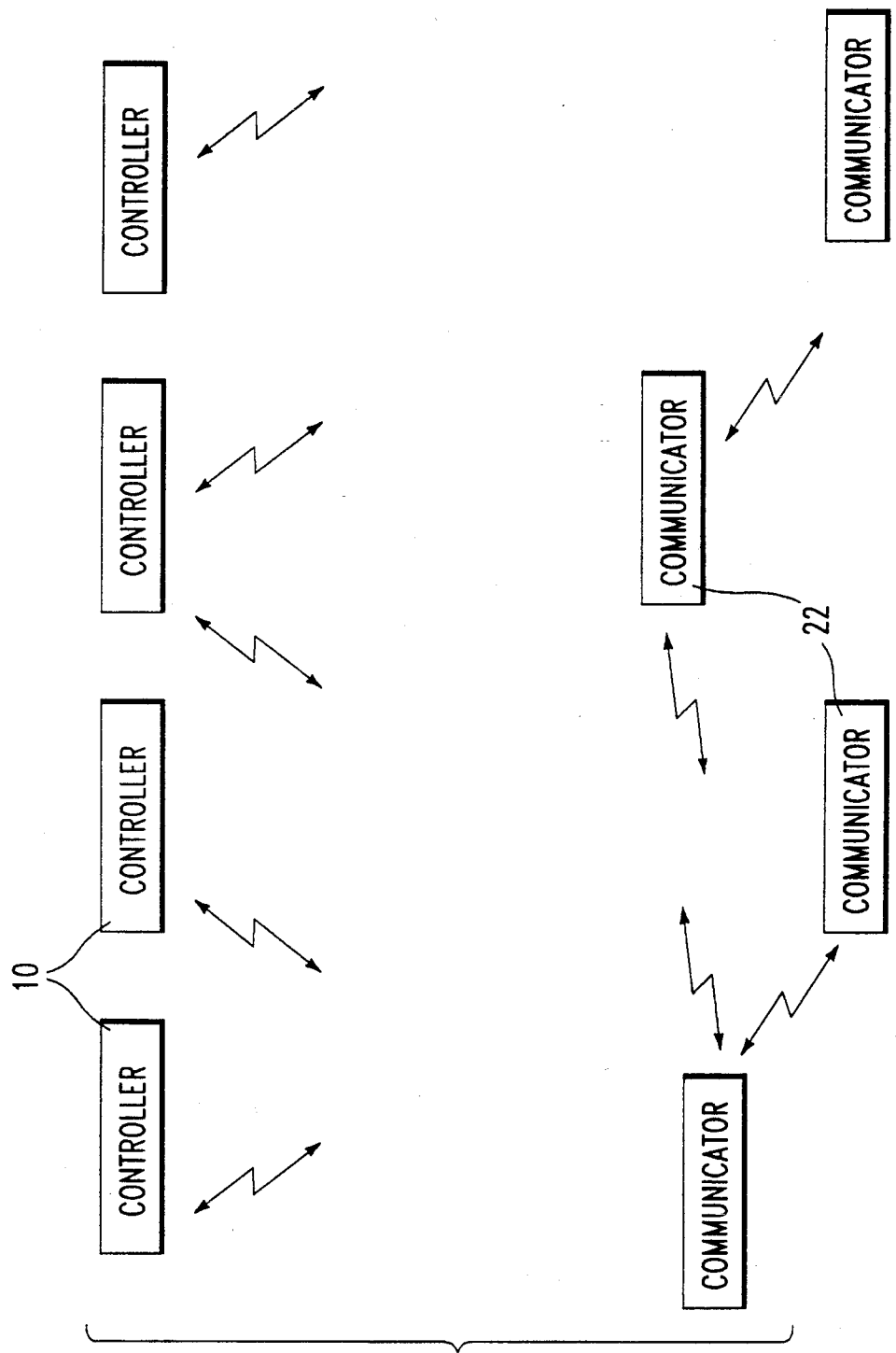
FIG. 4 is a representational diagram showing both a plurality of controllers and a plurality of communicators, the latter of which are able to communicate both via the controllers and by forming ad hoc networks.

The C-MATS communication system, as thus far described, is fully disclosed in the aforementioned U.S. patent application Ser. No. 07/477,996 (now allowed). One shortcoming of this C-MATS System is its inability to form an ad hoc network; that is, a small network in which two or more computers communicate directly with each other. FIG. 4 illustrates the objective of the present invention: a system which permits communication not only between controllers 10 and communicators 22, but also between the communicators themselves. This objective is accomplished, in accordance with the present invention, by providing a signal source within each communicator such that the communicator is capable of transmitting an EM energy signal at the same frequency as a controller. Indeed, this signal precisely emulates the signals produced by the controllers and is amplitude modulated by the data in the same manner as each controller. Since there is no requirement for the carrier to be remodulated by a communicator, one hundred percent modulation is possible.

Figure 5:
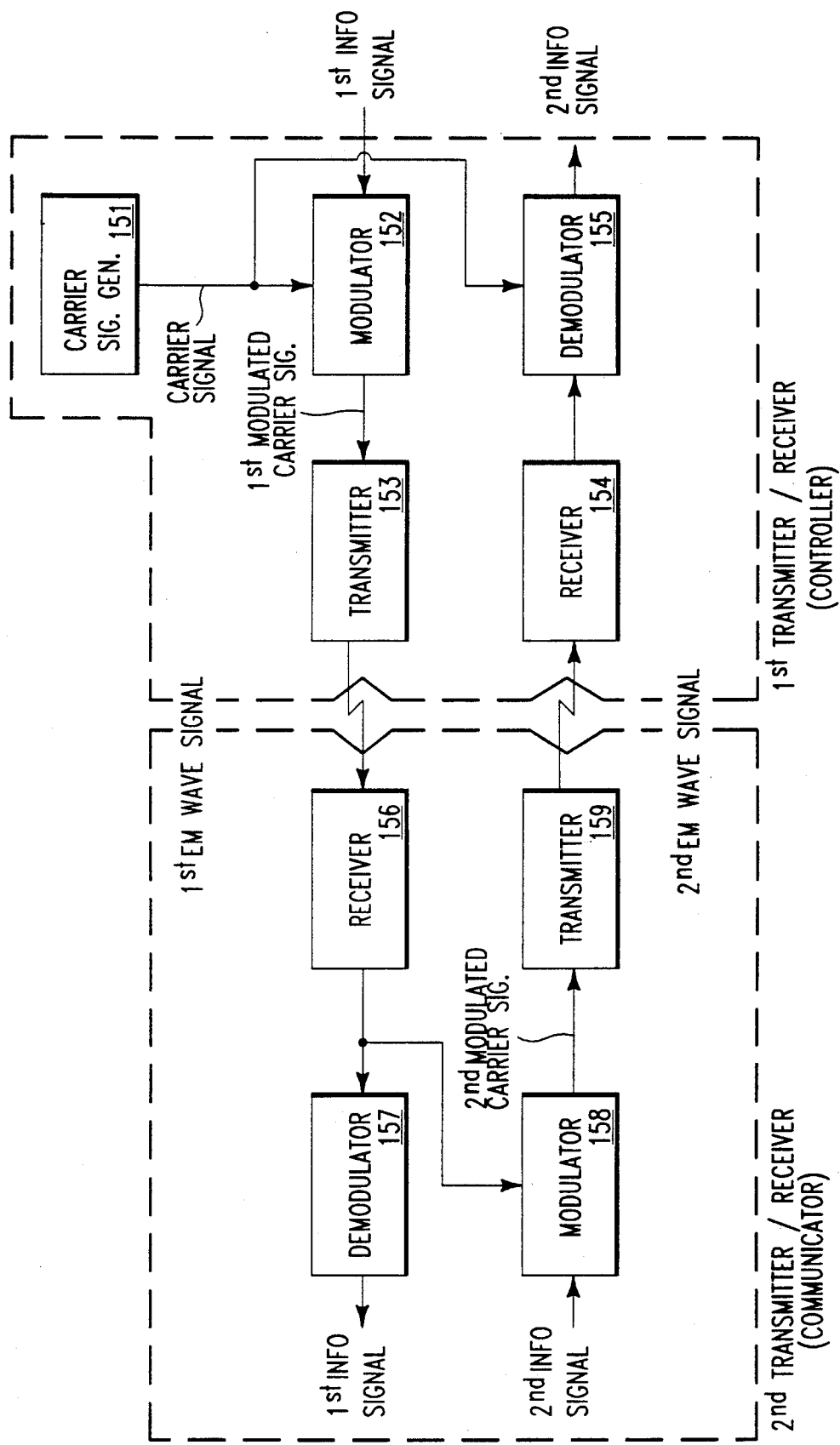
FIG. 5 is a block diagram of a communication system showing the basic components of both a controller and a communicator.
Figure 6:
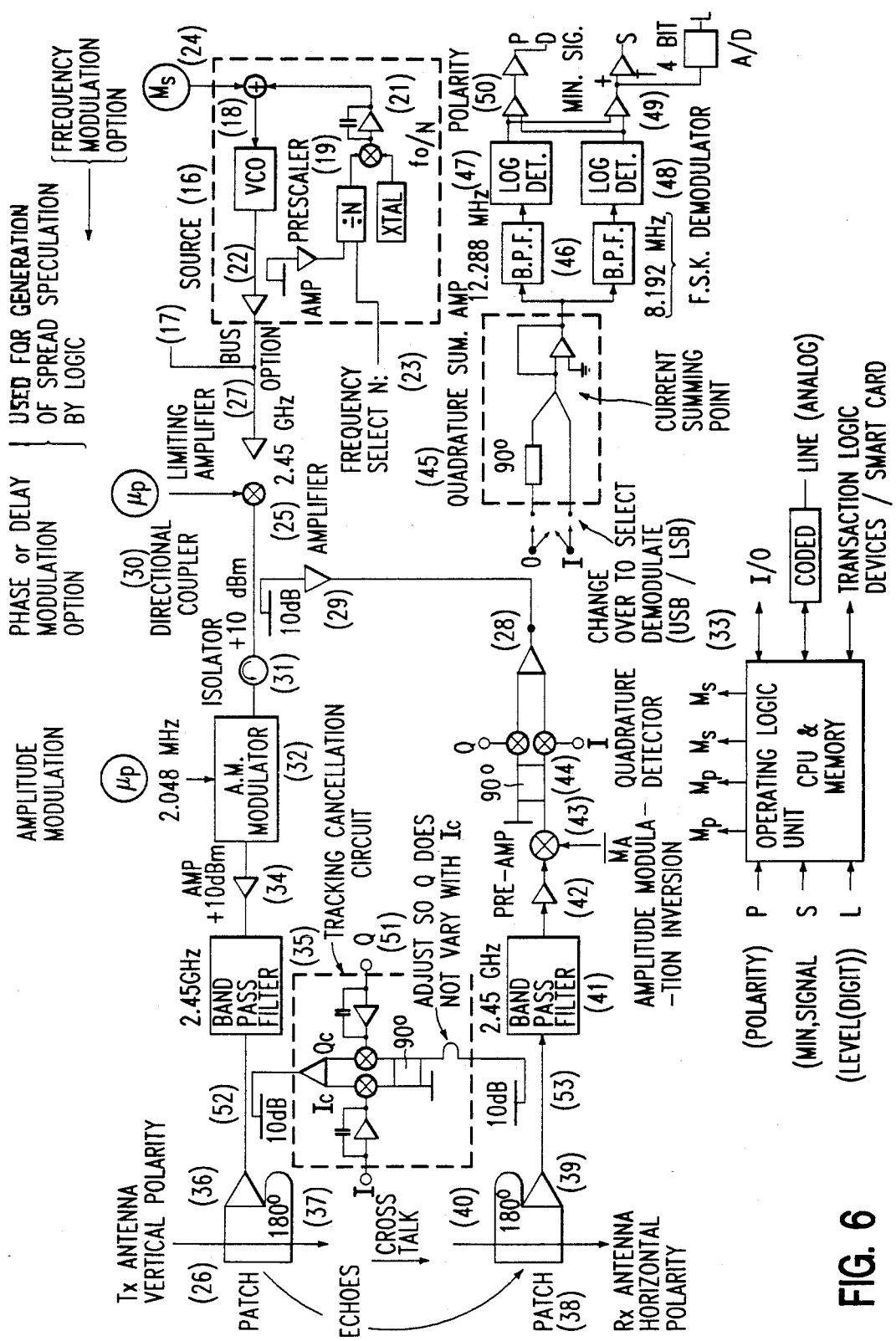
FIG. 6 is a functional block diagram of the controller shown in FIG. 5.
Figure 8A:
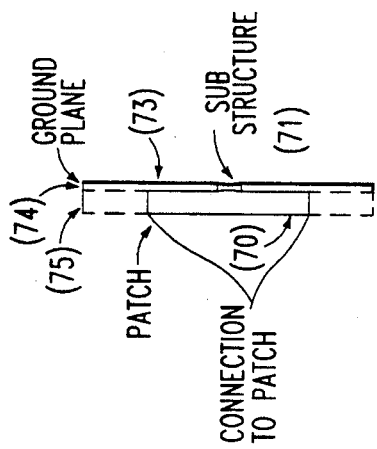
FIG. 8, which comprises the FIGS. 8a and 8b, shows elevation and side views, respectively, of the antenna employed in a communicator.
Figure 8B:
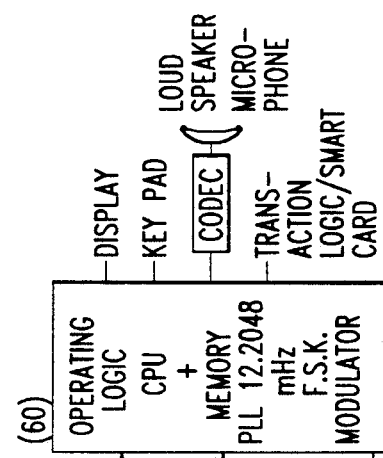
Figure 7:
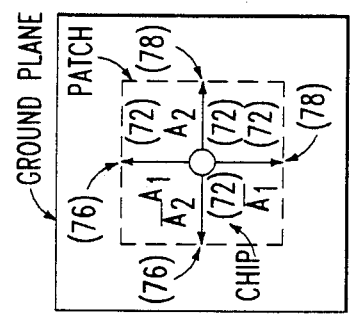
FIG. 7 is a functional block diagram of the communicator shown in FIG. 5.
Figure 7:
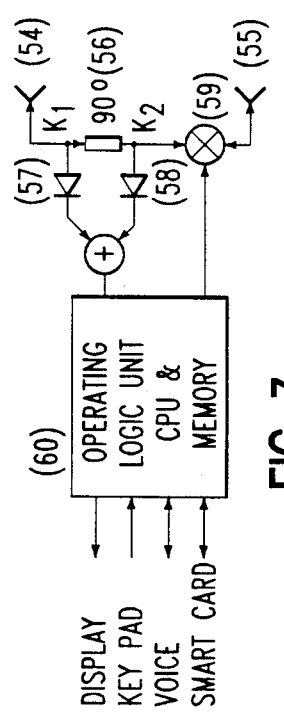
Figure 9:
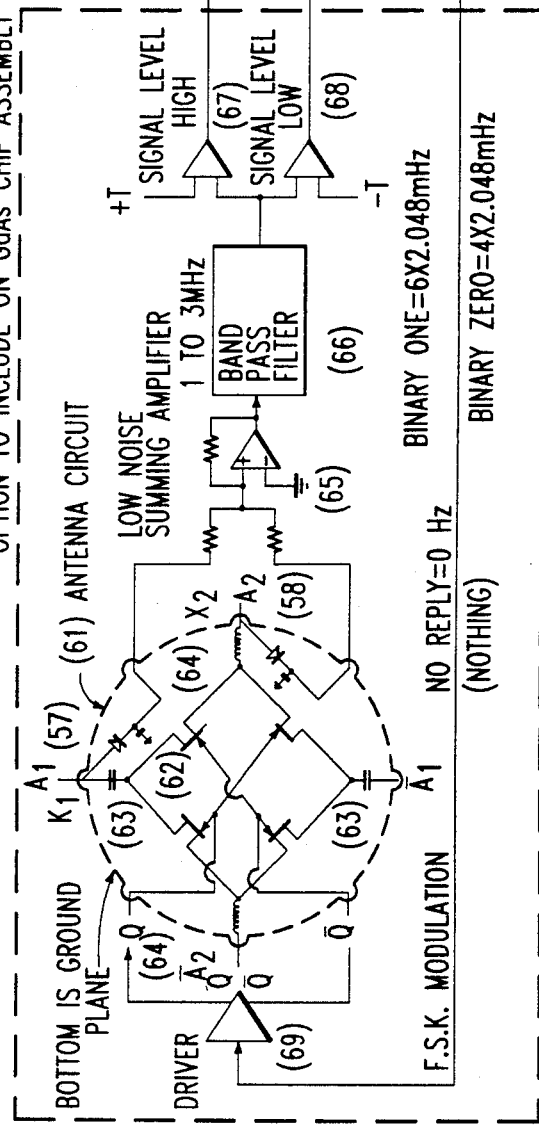
FIG. 9 is a detailed functional block diagram of the communicator shown in FIGS. 5 and 7.

FIG. 5 illustrates the communication system in block diagram form. As is there shown, a first transmitter/receiver—the controller—has a carrier signal generator 151 which produces a carrier signal at a prescribed frequency. This signal is amplitude modulated by a first information signal in a modulator 152 to produce a first modulated carrier signal. Amplitude modulation is preferably less than 50% to provide sufficient carrier beam energy for later reradiation by a communicator. This first modulated carrier signal is converted into electromagnetic wave energy by a transmitter 153 and the EM beam is received at a second transmitter/receiver—the communicator. The communicator comprises a receiver 152 which reconverts the EM energy back into an electrical signal and detects the first information signal by means of a simple power detector or demodulator 157. The received signal, at the prescribed carrier frequency, is supplied to a modulator 158. A second information signal, also supplied to the modulator 158, frequency modulates a sub-carrier which, in turn, phase modulates the incident carrier received by the receiver 156 to produce a second modulated carrier signal. This second modulated carrier signal is converted to EM energy by a transmitter 156 and retransmitted back to the controller. The controller reconverts the reradiated beam into an electrical signal by means of a receiver 154 and demodulates the signal to detect the second information signal by means of a demodulator 155.

The individual carrier frequencies of adjacent controllers are chosen so as not to interfere with each other. One of three methods may be used to prevent interference:

(1) The carriers may be different in frequency by a controlled amount;

(2) A spread spectrum method may be used, as either frequency hopping or a direct sequence; and (3) The carrier signals may be controlled by time division multiplexing.

In the system thus described, each communicator terminal detects a modulated incident carrier and uses this same carrier as the means for transmitting information from the communicator to the controller. Consequently, no set of communicators can interact with each other without the presence of a controller. This design has the advantage of eliminating the need for a carrier-generating device in a communicator, thus avoiding the need for certification of each communicator by regulatory authorities. It is also beneficial in that it avoids the possibility that one of the anticipated large number of communicators becomes "promiscuous" (i.e., radiates continuously without control) hence jamming the system. Finally, this communication system may advantageously be operated in a full duplex mode.

FIGS. 6-9 illustrate the structure of a controller and communicator in detail. These figures are identical to FIGS. 6-9, respectively, in the aforesaid U.S. patent application Ser. No. 07/477,996, the contents of which are incorporated herein by reference. A detailed discussion of these figures may be found in this patent application and need not be repeated here.

Figure 10:
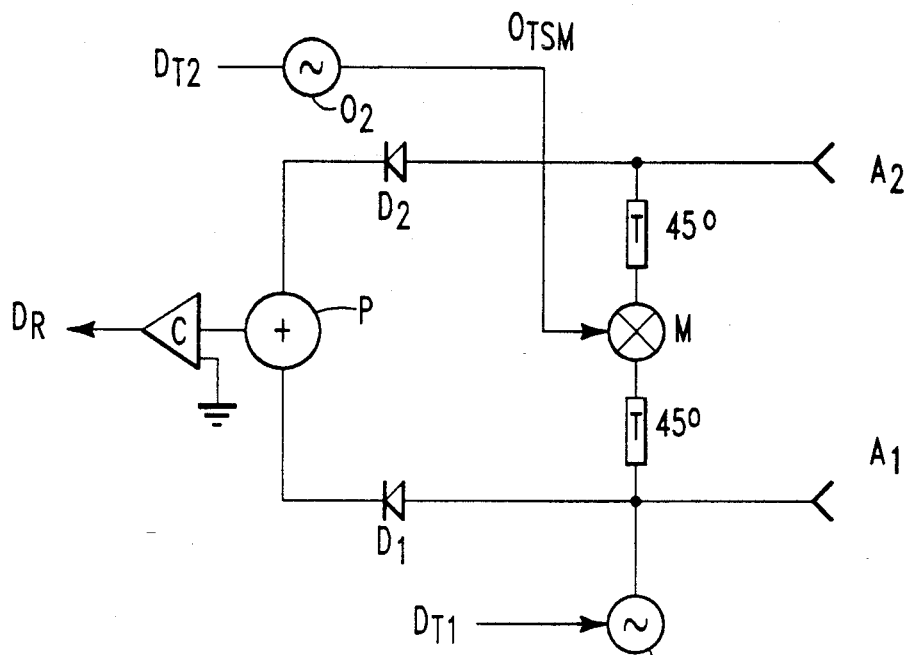
FIG. 10 is a functional block diagram of a portion of the communicator of FIG. 9 to which the capability of active transmission has been added.
Figure 11:
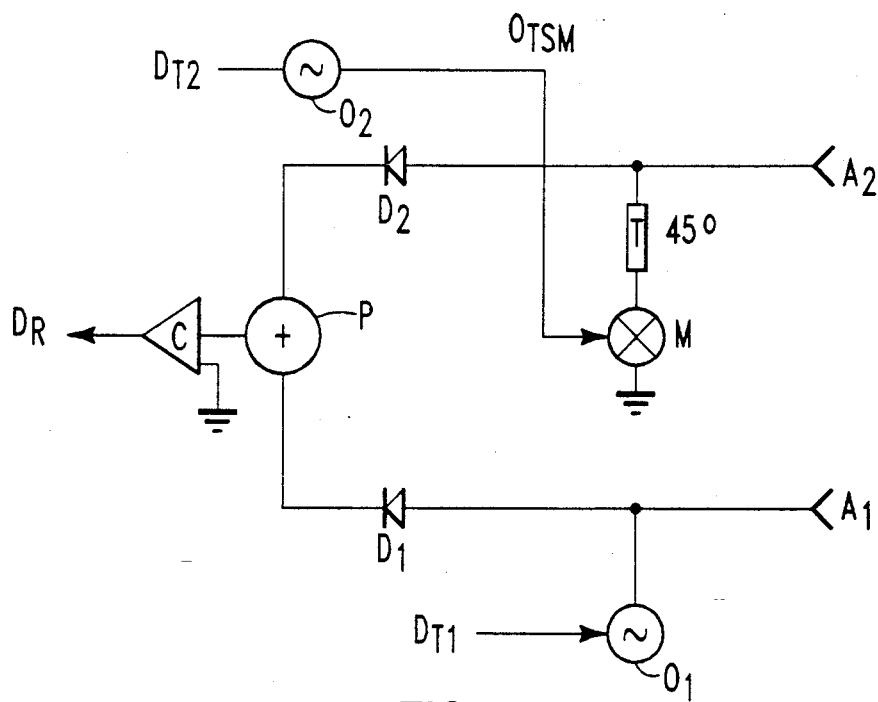
FIG. 11 is a functional block diagram of a modified form of the communicator shown in FIG. 9, to which the capability of active transmission has been added.

FIGS. 10 and 11 illustrate how a separate signal source may be provided at each communicator of the C-MATS system for selective operation and active transmission by the communicator. This signal source is similar to the signal source employed in the C-MATS controller. The major difference is that, while the carrier frequency is the same, this source can be modulated up to 100% in amplitude.

With this modification, each communicator has the capability of emulating the transmitting portion of a controller. The signal so produced by a communicator can now be detected by any other nearby communicator. Such transmissions cannot be detected by a controller because it is not responsive to amplitude modulated signals nor to the subcarriers generated. Moreover, the communicators do not have the capability to detect any remodulation of their generated carrier. Such a capability is unnecessary and relatively expensive.

The communication system according to the present invention can now operate adaptively to (1) backscatter modulate an incident EM beam with a modulated carrier, (2) generate its own modulated carrier or (3) do both at the same time. Clearly, when operating in the carrier generation mode, any communicator becomes capable of communicating directly with any other communicator. The C-MATS system, so modified, thus has the ability to form ad hoc networks and still retains the optional ability to separately or simultaneously participate in a host network formed from a system of C-MATS controllers.

The local carrier generating device for the communicators is potentially as simple as a light emitting diode. The carrier may also be generated by a dielectric resonator and a single transistor, or by other low cost means. Dielectric resonators are inexpensive and yet very accurate and stable in frequency.

In the ad hoc mode, a communicator equipped with the carrier generating device according to the present invention can communicate only with those other communicators in the near vicinity that can detect the radiation emissions. This allows a user not only to form an ad hoc local network, but also to do so without broadcasting over the backbone network, thereby providing for local privacy and optional access and participation in the wider network if required.

FIGS. 10 and 11 illustrate how an additional oscillator $O_1$ may be added to the C-MATS communicator circuit, as configured either in the transmission mode (FIG. 10) or the reflection mode (FIG. 11). The separately shown antennas A1 and A2 form a common antenna structure, where A1 and A2 are orthogonally polarized with respect to each other. A1 and A2 may be either linearly polarized together or circularly polarized together; however, in either case they are orthogonal to each other. The actual antenna structure will be described hereinbelow in connection with FIGS. 12-16.

The RF detectors D1 and D2 may be realized either as diodes or GaAs FET's. The output voltages of D1 and D2 are each proportional to the incident RF power. When these two output voltages are added, the two independent powers incident on antennas A1 and A2 are effectively added. As a result, the detected signal level produced by the adder P is passed to a comparator C which detects zero crossings of the signal. The resulting data, indicated as $D_R$, is therefore at the baseband frequency.

The oscillator $O_1$ may, for example, comprise a dielectrically loaded coaxial cavity resonator. This oscillator operates at the "downlink" RF carrier frequency. The oscillator $O_1$ 1 is active only during the high state of the data $D_{T1}$ and silent during the low state. This emulates the controller downlink mode. This mode may optionally operate during the same time as the subcarrier modulation.

The modulator M is implemented by a bi-lateral changeover switch which effects a sign reversal to the transmission mode RF path (FIG. 10) and an open/-short to the reflection mode RF energy incident on antenna $A_2$ (FIG. 11). In either case, the switch is driven by a frequency or phase modulated subcarrier, received from the oscillator $O_2$, that has been modulated by the baseband data $D_{T2}$.

The transmitted data $D_{T1}$ and $D_{T2}$ represent the "second information" which originates at the communicator. These data are optionally transmitted separately, or together as the system requires.

Figure 12:
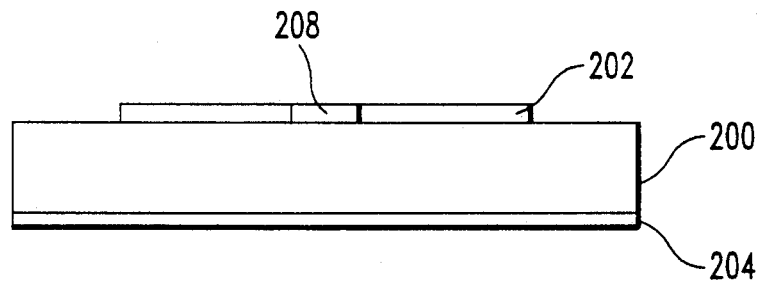
FIGS. 12 and 13 are elevation and side views, respectively, of the housing and antenna employed in a communicator which incorporates the improvement of the present invention.
Figure 13:
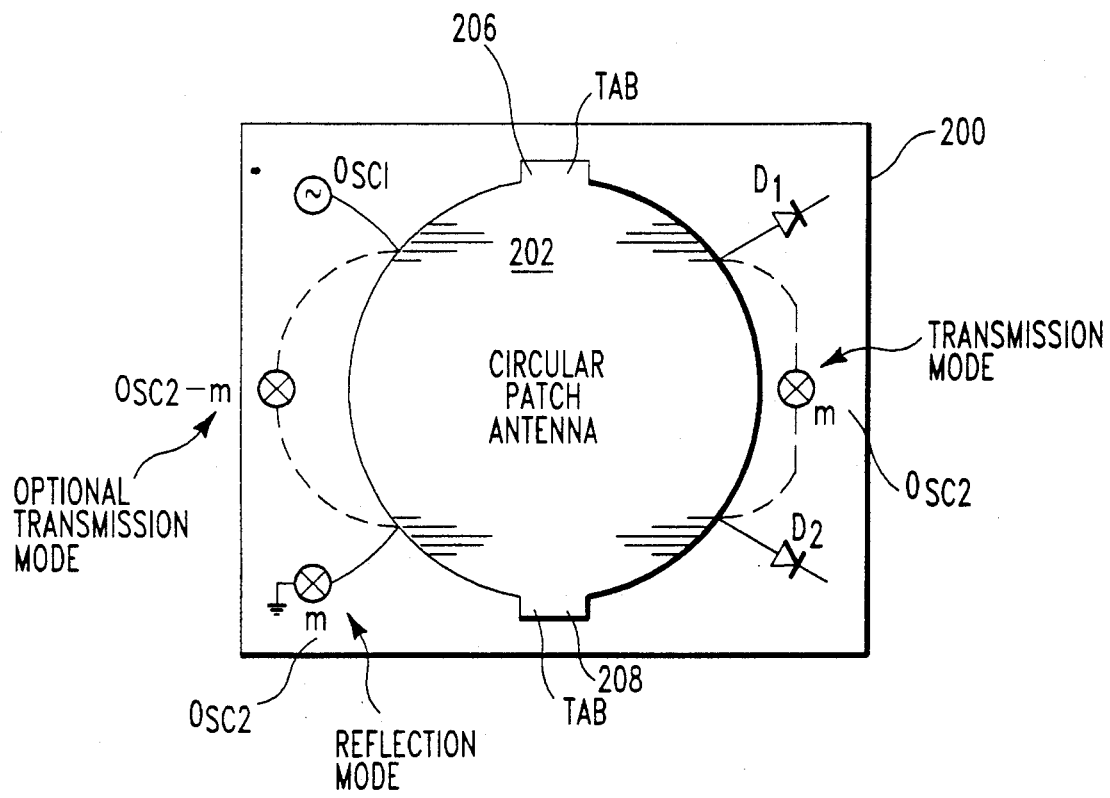

FIGS. 12 and 13 illustrate the physical structure of the communicator device according to the present invention. FIG. 12, which is a side view, shows a main housing 200, containing the electronic circuits, having a circular patch antenna 202 on one side and a ground plane 204 on the other. The top view, FIG. 13, shows the circular patch 202 as having two tabs 206 and 208 extending outward on opposite sides. These tabs, which cause the antenna to be more capacitively loaded, allow for circular polarization. If the circular patch is structured without these tabs, the polarization is linear.

Figure 14:
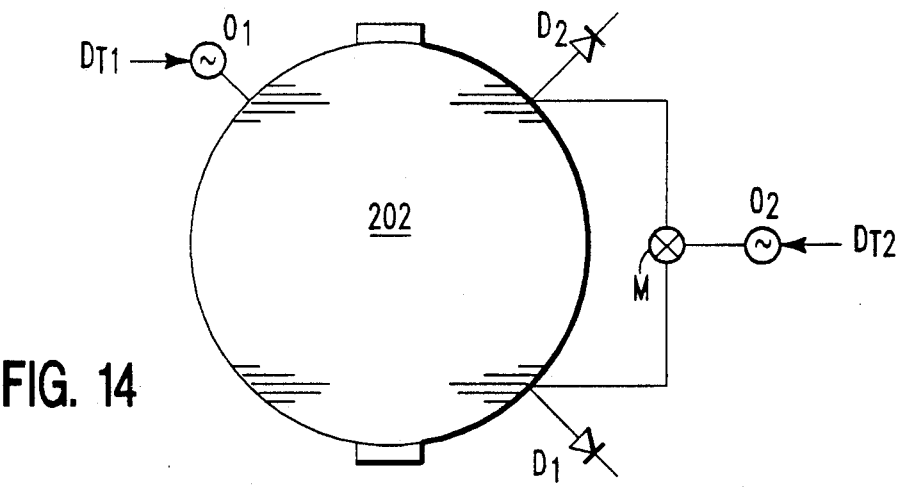
FIGS. 14, 15 and 16 are functional block diagrams of the antenna and a number of functional elements, showing the physical relationship of these elements in three different embodiments of the present invention.
Figure 15:
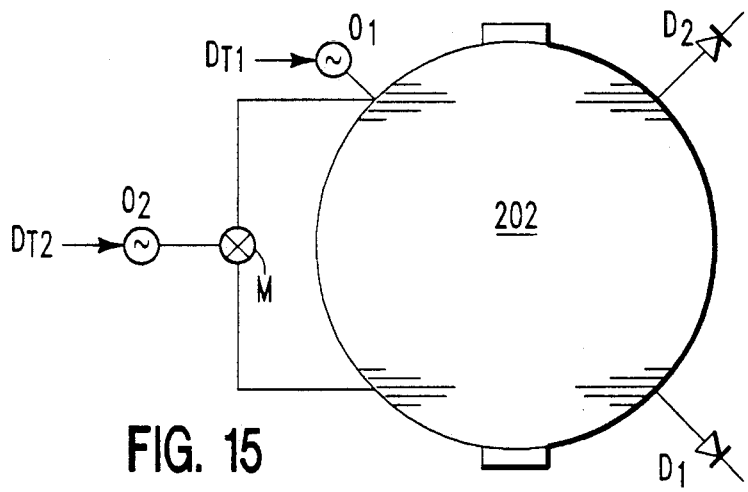
Figure 16:
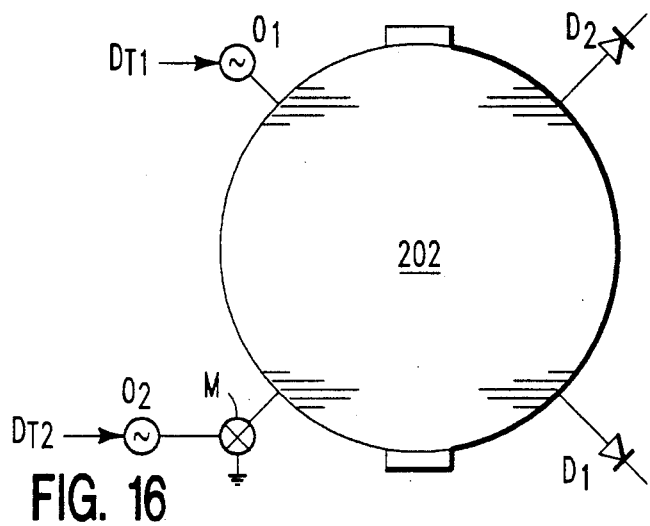

FIG. 13 also indicates how the various circuit elements of FIGS. 10 and 11 may be physically connected to the patch antenna. The various options are fully illustrated in FIGS. 14-17. In FIG. 14, the modulator M is connected at the points of connection of the two detectors D1 and D2, which are 90° apart at the edge of the circular patch. In FIG. 15, the modulator M is connected at the directly opposite side of the circular patch. Whereas FIGS. 14 and 15 illustrate the transmission mode, FIG. 16 shows the connections to the antenna for the reflection mode. In this case, it is most convenient if the modulator M is connected to the circular patch at a point directly opposite to the point of connection of the detector D2.

In all three embodiments the oscillator $O_1$ is connected to the circular patch at a point directly opposite to the point of connection of the detector D1.

Figure 17:
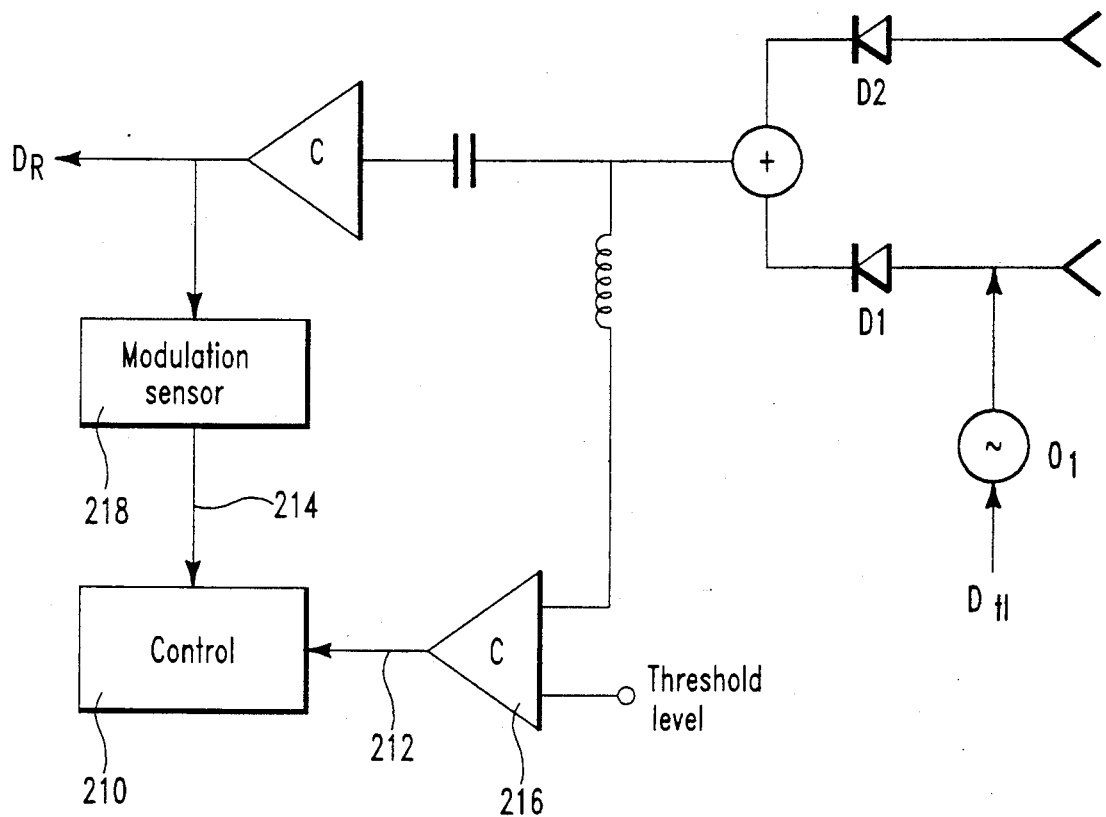
FIG. 17 is a functional block diagram of a portion of a communicator circuit illustrating the means for controlling such a circuit.

FIG. 17 illustrates how the communicator circuit may be controlled to either passively reradiate the incoming EM beam or actively transmit to form an ad hoc network. The network strategy for the communicator provides that, whenever a communicator wishes to join a network, it first listens to determine if a backbone network already exists. It may also test this fact by backscatter modulating a request packet on any detected carrier. If no reply results, it will conclude there is no backbone network. In this case, the communicator may now activate its own carrier generator and seek to communicate with other nearby communicators.

It is important to note that the communicator must transmit a significant part of its carrier over the same polarization that its detector operates. Furthermore, it is expected that in the active mode the antenna will still point upward toward a controller. Nonetheless, the communicator can still transmit laterally via the fringe field of the antenna. Also, when the communicator is located indoors, the reflections off the ceiling will facilitate the link. Alternatively, all participating members of the ad hoc network can point their antennas to the center of the network cluster for an improved and more private link.

In the circuit of FIG. 17, a control device 210 (microprocessor or the like) receives real time input signals on lines 212 and 214. The signal on line 212 indicates the presence of a carrier; the signal on line 214 indicates the presence of carrier modulation. The carrier is detected by measuring the DC power level received against a prescribed threshold via a comparator 216. The presence of modulation is determined by a modulation sensor 218.

Figure 18:
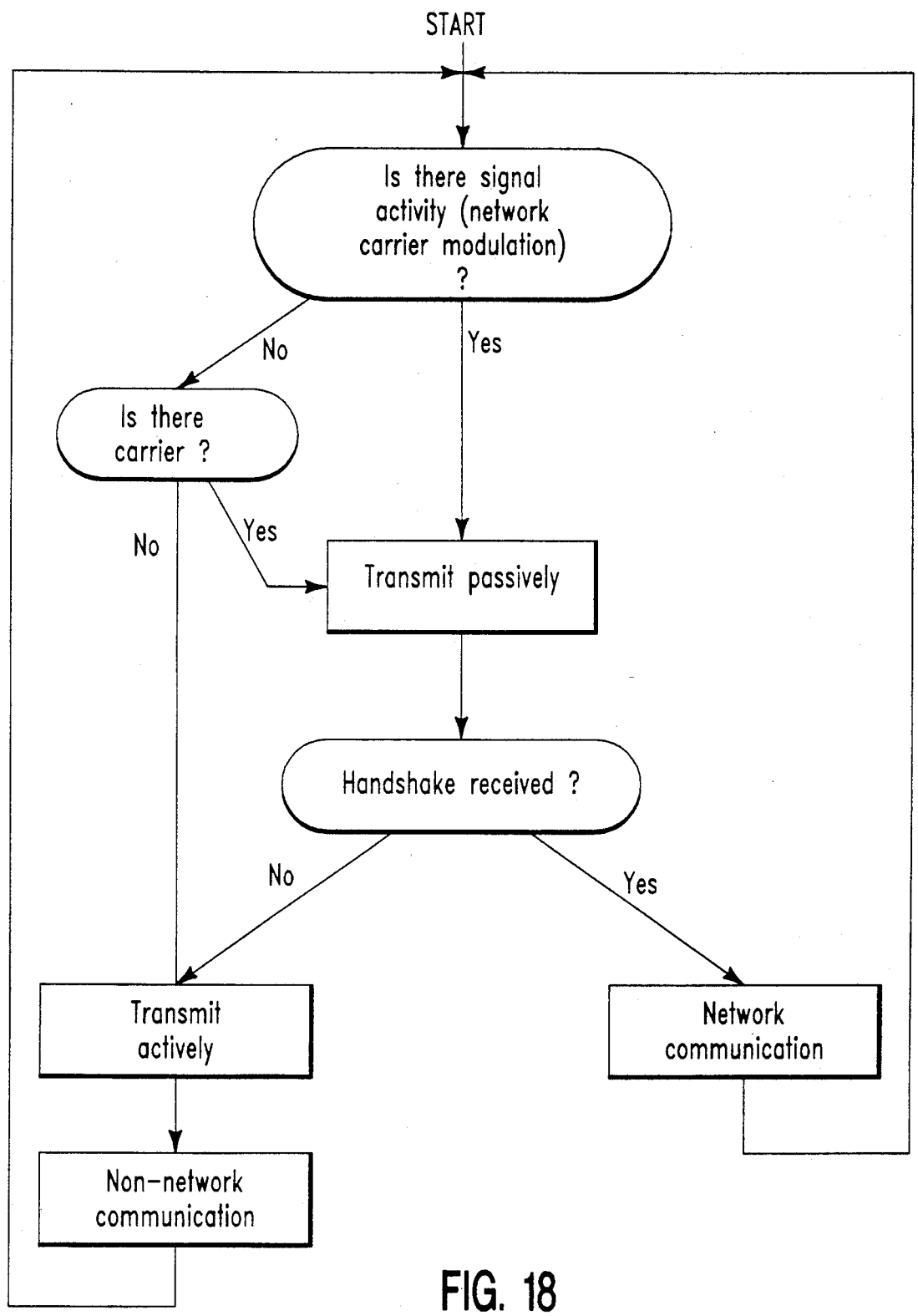
FIG. 18 is a flow chart showing the control algorithm for the communicator in accordance with the present invention.

The control device operates in accordance with the algorithm shown in FIG. 18. If there is network carrier modulation, the control device 210 initiates a passive transmission; that is, a backscatter modulation of the incoming beam. If there is no network carrier modulation, the control device looks for the presence of a carrier (on line 212). If a carrier is present, the communicator is caused to transmit passively.

After a passive transmission, the communicator looks for a "handshake" in the received data $D_R$. If a handshake is received, network communication takes place.

If no handshake is received, or if there is no carrier, the communicator is free to transmit actively and proceed with non-network communication.

There has thus been shown and described a novel universal communication system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. In apparatus for two-way communication between a first transmitter/receiver unit, called a controller, and a plurality of second transmitter/receiver units, called communicators,
said controller comprising:
  (a) first means for generating a first carrier signal;
  (b) second means for modulating said first carrier signal with a first informational signal to produce a first modulated carrier signal;
  (c) third means including a first antenna for transmitting said first modulated carrier signal as a first electromagnetic wave signal to said communicator;
  (d) fourth means including said first antenna for receiving a second electromagnetic wave signal transmitted by said communicator to reproduce a second modulated carrier signal; and
  (e) fifth means for demodulating said second modulated carrier signal to reproduce a second informational signal;
each of said communicators comprising:
  (f) sixth means including a second antenna for receiving said first electromagnetic wave signal transmitted by said controller to reproduce said first modulated carrier signal;
  (g) seventh means for demodulating said first modulated carrier signal to reproduce said first informational signal;
  (h) eighth means for backscatter modulating said first modulated carrier signal with a second informational signal to produce said second modulated carrier signal; and
  (i) ninth means including said second antenna for transmitting said second modulated carrier signal as said second electromagnetic wave signal;
the improvement wherein each of said communicators further comprises:
  (j) tenth means for generating a second carrier signal at substantially the same frequency as said first carrier signal;
  (k) eleventh means, coupled to said ninth means, for modulating said second carrier signal with a third informational signal to produce a third modulated carrier signal for transmission by said ninth means as a third electromagnetic wave signal; and
  (l) twelfth means for controlling the operation of at least one of said tenth and eleventh means to enable the transmission of said third modulated carrier signal;
wherein said sixth means and said seventh means in each of said communicators are operative to receive said third modulated carrier signal and to reproduce said third informational signal.

2. The communication apparatus defined in claim 1, wherein said twelfth means controls the operation of at least one of said tenth and eleventh means in dependence upon the presence or absence of the receipt of said first electromagnetic wave signal to enable the transmission of said third modulated carrier signal only during periods in which said first electromagnetic wave signal is not received.

3. In a communication system for use in an area having a human environment delimited from below by a floor and from above by an overhead environment substantially clear of human presence, said communication system comprising:
  (a) a first information source operative to independently generate first information;
  (b) a plurality of second information sources, each operative to independently generate second information;
  (c) a plurality of controllers, each coupled to said first information source and arranged in said overhead environment, for producing a substantially downwardly directed communication beam at a prescribed carrier frequency, imparting said first information to said beam, receiving a reradiated version of said beam and detecting therefrom said second information, the controllers being arranged such that the beams substantially contiguously irradiate a region of said human environment; and
  (d) a plurality of communicators, each coupled to one of said second information sources and arranged in said human environment, each communicator including means for receiving one of said beams, detecting said first information from said one beam and supplying said first information to an information user, each communicator further including means for reradiating said one beam in the direction of the controller that produced it and means for imparting said second information to the reradiated version of said beam;
the improvement wherein each of said communicators further includes:
  (e) first means for generating a carrier signal at substantially the same frequency as said prescribed carrier frequency;
  (f) second means, coupled to said first means, for modulating said carrier signal with said second information signal to produce a modulated carrier signal;
  (g) third means for transmitting said modulated carrier signal substantially omni-directionally within said human environment; and
  (h) fourth means for controlling the operation of at least one of said first, second and said third means
wherein each of said communicators is operative to receive said modulated carrier signal and to reproduce said second informational signal.

4. The communication system defined in claim 3, wherein said third means transmits said modulated carrier signal substantially omni-directionally within said human environment.

* * * * *